(12) United States Patent
Hetzer et al.

(10) Patent No.: US 7,208,687 B2
(45) Date of Patent: Apr. 24, 2007

(54) SEAL FOR A COVER FOR AN ELECTRICAL CONNECTING SOCKET

(75) Inventors: Ulrich Hetzer, Berlin (DE); Ferenc Nad, Berlin (DE)

(73) Assignee: ADC GmbH, Berlin (DE)

(*) Notice: Subject to any disclaimer, the term of this patent is extended or adjusted under 35 U.S.C. 154(b) by 0 days.

(21) Appl. No.: 11/344,544

(22) Filed: Jan. 30, 2006

(65) Prior Publication Data
US 2006/0191699 A1 Aug. 31, 2006

(30) Foreign Application Priority Data
Feb. 4, 2005 (DE) .................. 10 2005 005 128

(51) Int. Cl.
*H02G 3/18* (2006.01)
(52) U.S. Cl. .............. 174/654; 174/655; 174/663; 174/135; 16/2.1; 248/56
(58) Field of Classification Search ............. 174/654, 174/655, 659–663, 135; 439/271, 272; 248/56; 16/2.1, 2.2
See application file for complete search history.

(56) References Cited

U.S. PATENT DOCUMENTS

| | | | |
|---|---|---|---|
| 5,072,072 A * | 12/1991 | Bawa et al. .............. | 174/655 |
| 5,731,544 A * | 3/1998 | Burck et al. ............. | 174/66 |
| 6,172,300 B1 * | 1/2001 | Kawaguchi .............. | 174/59 |
| 6,184,467 B1 * | 2/2001 | Milanowski et al. ...... | 174/655 |
| 6,679,723 B1 * | 1/2004 | Robinson ................ | 439/483 |
| 7,011,539 B1 * | 3/2006 | Nagy et al. .............. | 439/271 |
| 7,056,137 B1 * | 6/2006 | Vall Gendre et al. ..... | 439/271 |

FOREIGN PATENT DOCUMENTS

| | | |
|---|---|---|
| DE | 92 01 244.2 | 3/1992 |
| DE | G 92 01 244.2 | 3/1992 |
| EP | 0 810 693 | 12/1997 |
| EP | 0 810 693 B1 | 7/2001 |

* cited by examiner

*Primary Examiner*—Dhiru R. Patel
(74) *Attorney, Agent, or Firm*—Merchant & Gould P.C.

(57) ABSTRACT

The invention relates to a seal (5) for a cover (8a, 8b) for an electrical connecting socket (32), with the seal (5) having at least one sealing lip (10) which is provided to make contact with a contact surface (30) when the seal (5) is in the compressed state and thus to seal at least a part of that area of a base body (1) which is covered by the cover (8a, 8b), and wherein the sealing lip (10) has at least one first circumferential rim (25) on its inner face (15), which rim (25) is in each case formed, when the seal (5) is in the unloaded state, by the contact edge of a first (16) and of a second (17) surface element, which each run along the surface of the sealing lip (10), and has at least one second circumferential rim (26) which, when the seal (5) is in the unloaded state, is formed by the contact edge of the second (17) and of the third (18) surface element, which each run along the surface of the sealing lip (10), with the first circumferential rim (25) making contact with the contact surface (30) when the seal (5) is in the compressed state, and bounding the area to be sealed.

26 Claims, 2 Drawing Sheets

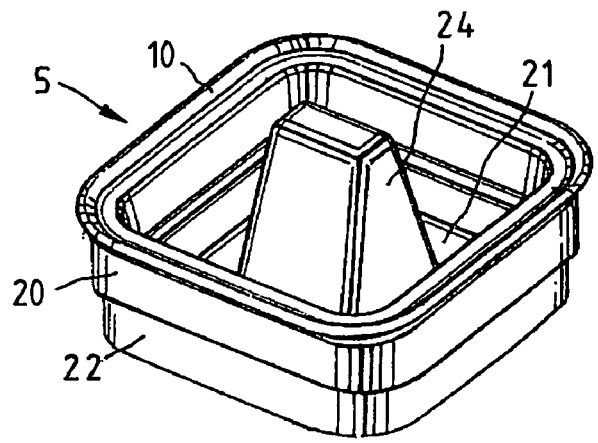
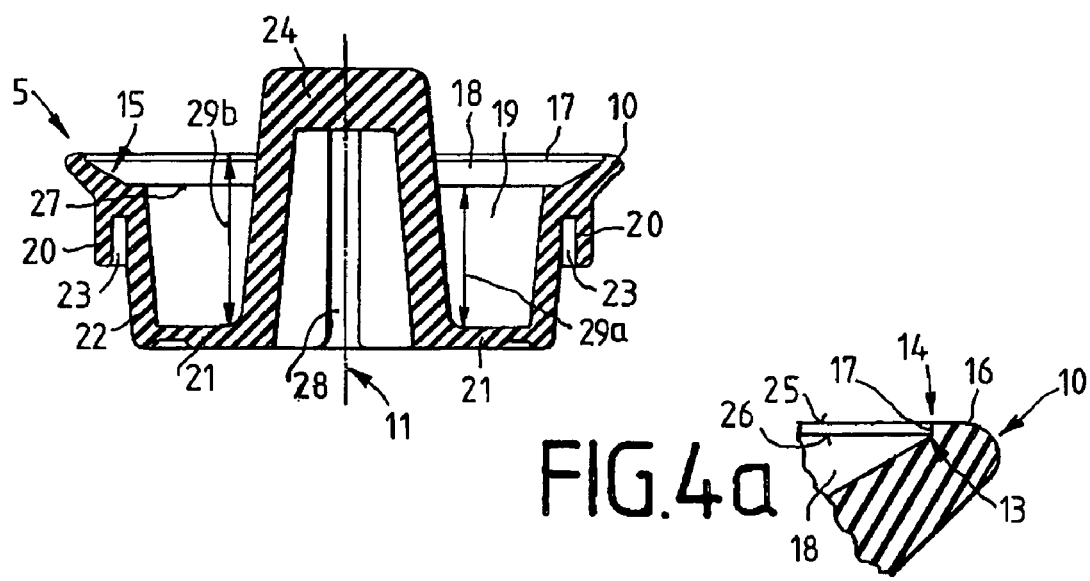
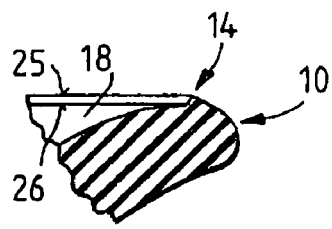

SEAL FOR A COVER FOR AN ELECTRICAL CONNECTING SOCKET

BACKGROUND

Connecting boxes which are provided with a connecting socket which can be covered are increasingly required for electrical connections in the industrial world, for example for data lines, electrical cables and connections which are used in particular in a manufacturing environment, that is to say in factory or assembly halls, or else in the field of technical maintenance and repair, for example in workshops. In this case, the requirements are comparatively stringent with regard to protection of the connection located in the connecting socket against dust, items used during operation or cleaning agents, particularly in the state when a plug is not fitted, for which reason it is necessary for the plug-in socket cover to be sealed, for example, against oil and dirt, or else against cleaning agents as well as water splashes and water condensation. In this case, folding covers are frequently used because they are simple to handle, although they are relatively difficult to seal owing to the non-uniform contact forces acting on the seal. Thus, when the requirements relating to the sealing of the cover are stringent, conventional seals generally do not provide satisfactory results. Suitable seals which may be used for the described application also have to satisfy further preconditions, in addition to providing adequate sealing. For example, on the one hand, it is necessary to have the capability for the seal to be fitted and fixed easily. On the other hand, simple handling must be possible in the daily operating conditions, for example during replacement of the seal or during cleaning, and it must be possible to ensure that the sealing effect is produced easily and reproducibly.

SUMMARY

The invention is thus based on the technical problem of providing a suitable seal for a cover for an electrical connecting socket.

The invention is in this case based on the discovery that a cover for an electrical connecting socket, in particular in the folding version, allows particularly good sealing when a seal is used which has a specifically designed sealing lip which is suitable for making contact with a contact surface when the seal is in the compressed state in order in this way to seal at least a part of the area which is covered by the cover of a base body in which the connecting socket is provided. According to the invention, this is achieved in that the sealing lip has at least one first circumferential rim on its inner face, which rim is in each case formed, when the seal is in the unloaded state, by the contact edge of a first and of a second surface element, which each run along the surface of the sealing lip, and has at least one second circumferential rim which, when the seal is in the unloaded state, is formed by the contact edge of the second and of the third surface element, which each run along the surface of the sealing lip, with the first circumferential rim making contact with the contact surface when the seal is in the compressed state, and bounding the area to be sealed. This relatively simple design of the seal makes it possible to achieve the required results in particular with regard to sealing. The inner face of the sealing lip is in this case that face of the sealing lip which is located within the area to be sealed. This is bounded by the first circumferential rim of the sealing lip, which thus complements the inner face of the sealing lip. The compressed state of the seal is in this case that state in which the cover is closed and in which the connecting socket, which is located on the base body, is completely covered and closed, so that the seal which is located between the cover and the base body is slightly compressed, thus resulting in a sealing effect. In contrast, the unloaded state of the seal is that state in which the cover is not closed and the connecting socket which is located on the base body is not completely covered and closed, for which reason the seal is also not compressed and there is therefore no sealing effect.

In one advantageous embodiment, the first surface element runs at right angles to the vertical axis of the seal, and the second surface element runs parallel to the vertical axis of the seal. This version admittedly represents a preferred refinement of the seal, but it is also feasible for the alignments of the surface elements to differ from this strict rule without significantly adversely affecting the sealing function.

In a further advantageous embodiment, the first circumferential rim forms a raised area in the cross-sectional profile of the sealing lip, and the second circumferential rim forms a notch in the cross-sectional profile of the sealing lip. This makes it possible to ensure that the first circumferential rim assumes a slightly exposed position in the direction of the contact surface, particularly when the seal is in the compressed state, in which the sealing lip is positioned slightly away from the contact surface in the direction of the lower face of the seal, and can then make continuous contact with the contact surface in order thus to produce a satisfactory sealing effect without any interruption along its running edge. Owing to the relatively small size of the raised area which is formed from the circumferential rim, the surface pressure on the contact surface when the seal is in the compressed state is high, thus making it possible to compensate better for unevennesses and thus to achieve a better sealing effect.

In a further advantageous embodiment, the sealing lip is pressed against the contact surface by means of a spring force. Particularly in the case of folding covers, this represents a preferred version since, by way of example, a spring can then be provided on the folding mechanism of the cover, which holds the cover in the closed position by means of spring force, thus fixing the seal in the compressed state resiliently.

In one preferred embodiment, the seal is formed from rubber-like material. A seal which is formed from rubber or a rubber-like material allows a satisfactory sealing effect to be achieved in the commonest applications with comparatively low material costs and low contact forces. However, furthermore, it is also feasible for any other desired elastic materials to be used as sealing materials provided that they have the necessary sealing characteristics.

In a further embodiment, the seal is fitted to that side of the cover which faces the base body and the contact surface is located on the base body, with the contact surface surrounding the connecting socket. Admittedly, while ensuring the desired method of operation of the invention, it is fundamentally also feasible for the seal to be fitted to the base body while the contact surface is located opposite on the cover, but it is in fact preferable for the seal to be accommodated in the cover. A design such as this offers the advantage that it provides more freedom for the rest of the external design of the seal since the latter then need not be laid around the connecting socket. This then makes it possible, for example, to adopt better design measures to simplify handling during replacement and cleaning of the seal.

In a further embodiment, the seal has at least one profile lip and at least one cutout on its side facing the cover, which profile lip and cutout can engage with a profile rim which is fitted on the inner face of the cover. This allows the seal to be fitted easily to the inner face of the cover and to be fixed detachably there without further measures, for example the use of adhesives, being required for this purpose.

In a further advantageous embodiment, the seal has a base surface with the sealing lip being arranged at a vertical distance from this base surface, and has a side wall which connects the sealing lip and the base surface to one another. The provision of a base surface offers the advantage of a better sealing effect with respect to the connecting socket to be covered, since the seal then itself forms a type of cover which then entirely covers and closes the opening in the connecting socket by means of the base surface. Furthermore, one preferred embodiment has a third circumferential rim on the inner face of the seal, which is formed by the contact edge of the third surface element, which runs along the surface of the sealing lip, and the inner surface of the side wall. Furthermore, a profile rim may also additionally be provided on the base body, which engages in the opening in the connecting socket and, when the cover is in the closed state, makes contact with the base surface of the seal, thus resulting in an additional sealing effect. The provision of a vertical distance between the base surface and the sealing lip in this case makes it easier to fit and fix the seal in the cover. In this case, the expression "vertical" should be understood as meaning that the distance should be measured in a direction which is at right angles to the plane on which the base surface of the seal is located, while distance components parallel to the plane of the base surface should be ignored in this case.

In a further advantageous embodiment, a profile tab, which projects at right angles from the base surface is provided in the center of the base surface, on its side facing away from the cover. This at the same time acts as a type of handle and thus offers the capability to remove the seal easily from its position mounted in the cover.

In a further advantageous embodiment, the profile tab is wedge-shaped. The wedge shape in this case additionally makes it easier to grip the profile tab, for example with two fingers, in order for a user to remove the seal from its position mounted in the cover.

In a further advantageous embodiment, the profile tab is longer than the vertical distance between the base surface and the first circumferential rim of the sealing lip. The profile tab thus projects beyond the first circumferential rim of the sealing lip, and into the opening in the connecting socket when the cover is in the closed state. A longer version of the profile tab such as this additionally makes it easier to grip the profile tab in order to remove the seal from the cover.

In a further advantageous embodiment, a cavity is provided in the interior of the profile tab, is open on the lower face of the seal and can engage with a profile web, which is provided on the cover and is fitted vertically on that side of the cover which faces the base body. In this case, the cavity preferably has the same external shape as the profile web, at least in places. The engagement of the profile web in the correspondingly shaped cavity in this case additionally improves the detachable anchoring of the seal on the cover, ensures that the seal is in the correct position, and helps to avoid lateral movements or deformation of the seal.

In a further advantageous embodiment, the cavity and the profile web have a cruciform cross section, at least in places.

This additionally fixes and stabilizes the position of the seal on the inner face of the cover both in the unloaded state and in the compressed state.

BRIEF DESCRIPTION OF THE DRAWINGS

The invention will be explained in more detail in the following text with reference to one preferred exemplary embodiment. In the associated drawings:

FIG. 2 shows an enlarged perspective illustration of the seal, FIG. 3 shows a cross-sectional view of the seal in the unloaded state, FIG. 4a shows an enlarged detail illustration of the cross-sectional view of the seal in the unloaded state, and FIG. 4b shows an enlarged detail illustration of the cross-sectional view of the seal in the compressed state.

DETAILED DESCRIPTION

Figure 1:
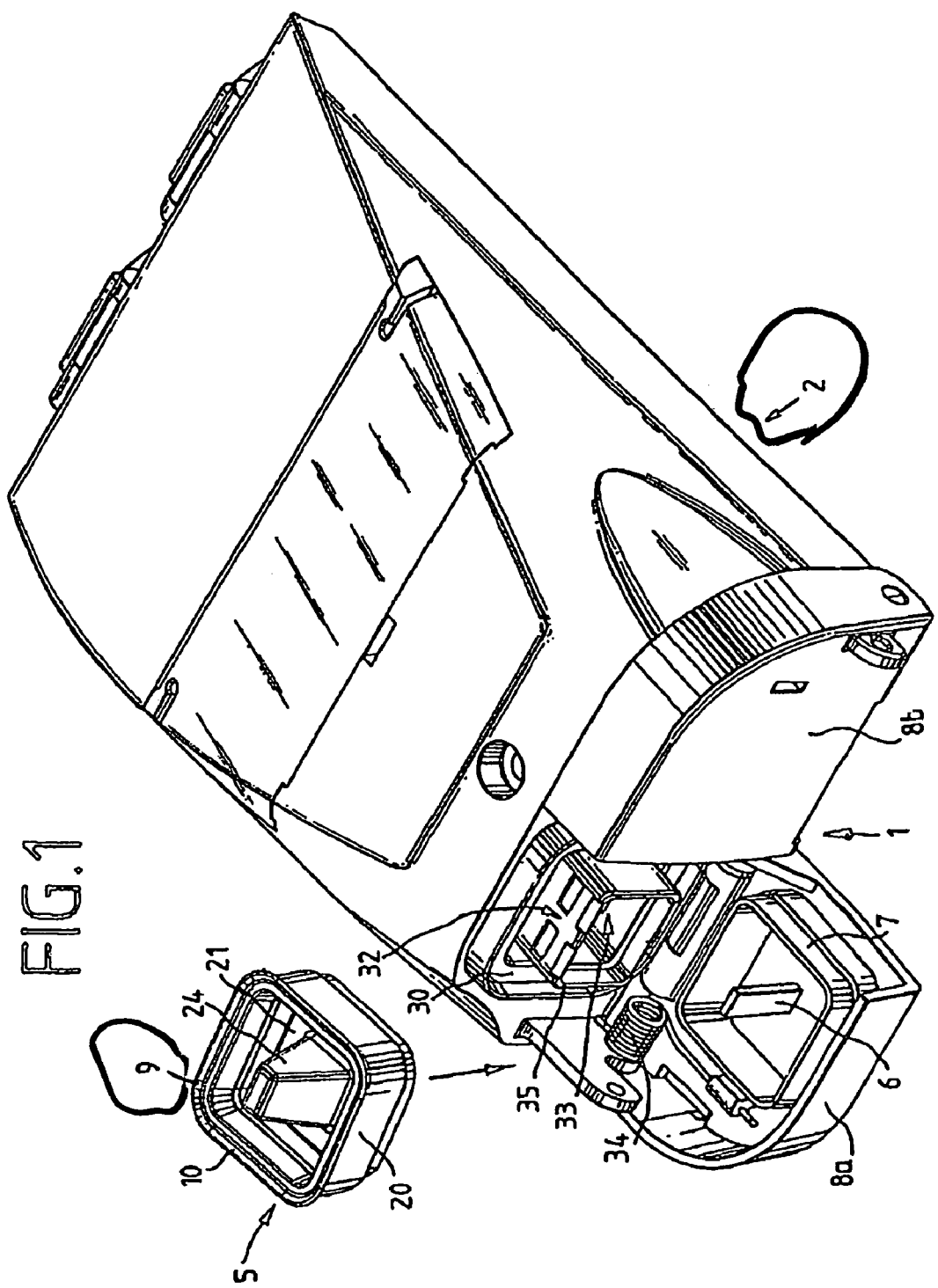
FIG. 1 shows a perspective illustration in the form of an exploded view of one preferred embodiment of a seal according to the invention for a cover for an electrical connecting socket.

FIG. 1 shows a perspective exploded view of one preferred embodiment of a seal 5 for a cover 8a, 8b for an electrical connecting socket 32 of a connecting box 2. In the preferred embodiment that is illustrated, the connecting socket 32 is a component of a base body 1 which is in the form of a wall outlet box as is used, by way of example, for data lines in factory halls. The base body 1 in this case has two folding covers 8a, 8b, with the right-hand cover 8b being shown in the folded-up state, and the left-hand cover 8a being shown in the unfolded state. A seal 5 having a body 9 composed of a rubber-like material can be fitted to the inner face, that is to say to the side facing the base body 1, of the cover 8a although it is shown in the removed state in the drawing, rather than in the fitted state. This state of the seal 5 is also illustrated, enlarged, in FIG. 2. A contact surface 30, which surrounds the connecting socket 32, is located on the base body 1. The body 9 of the seal 5 has a sealing lip 10 which makes contact with the contact surface 30 when the seal 5 is in the compressed state, in order in this way to seal a part of the area which is covered by the cover 8a of a base body 1 in which the connecting socket 32 is provided. A spring 34 is provided on the folding mechanism of the cover 8a, whose spring stress tries to close the cover 8a and to hold it in the closed position. When the cover 8a is in the closed state, the sealing lip 10 is in consequence—when the seal 5 is fitted—pressed by means of spring force against the contact surface 30, thus fixing the seal 5 in the compressed state resiliently. In FIG. 1 and FIG. 2, the seal 5 is shown in the unloaded state. Provided that the seal 5 has been inserted into the cover 8a, 8b, this is that state in which the cover 8a, 8b is not closed and the connecting socket 32 which is located on the base body 1 is not completely covered and closed, for which reason the seal 5 is in this case not compressed, so that there is no sealing effect. In contrast, the compressed state of the seal 5 is that state in which the cover 8a, 8b is closed, and in which the connecting socket 32 which is located on the base body 1 is completely covered and closed, as a result of which the seal 5, which is located between the cover 8a, 8b and the base body 1, is slightly compressed, thus producing a sealing effect. On its side facing the cover 8a, the body 9 of the seal 5 has a profile lip 20 and a cutout 23 (see FIG. 3) which can engage with a profile rim 7 which is fitted on the inner face of the cover 8a.

This allows the seal 5 to be fitted easily to the inner face of the cover 8a, and to be detachably fixed there. Furthermore, the body 9 of the seal 5 has a base surface 21 with a sealing lip 10 being arranged at a vertical distance 29a (see FIG. 3) from it, and a side wall 22 (see FIG. 2) which connects the sealing lip 10 and the base surface 21 to one another. A profile rim 35 is provided on the base body 1, engages in the opening 33 in the connecting socket 32 and, when the cover 8a is in the closed state, makes contact with the base surface 21 of the seal 5, thus producing an additional sealing effect. A wedge-shaped profile tab 24 which projects at right angles from the base surface 21 is provided in the center of the base surface 21, on its side which faces away from the cover 8a. This profile tab 24 is used primarily as a handle and makes it possible to easily remove the seal 5 from its position mounted in the cover 8a.

FIG. 3 shows a cross-sectional view of the preferred embodiment of the seal 5 in the unloaded state. The sealing lip 10 illustrated there has on its inner face 15 a first circumferential rim 25 (see FIG. 4a and FIG. 4b) which, when the seal 5 is in the unloaded state, is formed by the contact edge of a first surface element 16 (see FIG. 4a and FIG. 4b) and a second surface element 17, which in each case run along the surface of the sealing lip 10. The inner face 15 (see FIG. 3) of the sealing lip 10 is in this case that face of the sealing lip 10 which is located within the area to be sealed. This is bounded by the first circumferential rim 25 of the sealing lip 10, which thus complements the inner face 15 of the sealing lip 10. Furthermore, the sealing lip 10 has a second circumferential rim 26 (see FIG. 4a and FIG. 4b) which, when the seal 5 is in the unloaded state, is formed by the contact edge of the second surface element 17 and a third surface element 18, which likewise runs along the surface of the sealing lip 10, with the first circumferential rim 25 making contact with the contact surface 30 of the base body 1, and bounding the area to be sealed, when the seal 5 is in the compressed state. Furthermore, on its inner face, the seal 5 has a third circumferential rim 27, which is formed by the contact edge of the third surface element 18, which runs along the surface of the sealing lip 10, and the inner surface of the side wall 22. The wedge-shaped profile tab 24 which projects at right angles from the base surface 21 is longer than the vertical distance 29b between the base surface 21 and the first circumferential rim 25 of the sealing lip 10. The profile tab 24 thus projects beyond the first circumferential rim 25 of the sealing lip 10 and, when the cover 8a is in the closed state, into the opening 33 in the connecting socket 32. A cavity 28 is provided in the interior of the profile tab 24 and is open on the lower face of the seal 5, and can engage with a profile web 6, which is provided on the cover 8a and is fitted at right angles on that side of the cover 8a which faces the base body 1, so that the seal 5 can additionally be fixed, stabilized and correctly positioned on the cover 8a. In this case, the cavity 28 has the same external shape as the profile web 6, at least in places, and preferably has a cruciform cross section. The profiled web 6 may be designed either, as illustrated, in the form of a bar, in a cruciform shape or in the form of a bar with additional inclines which are at right angles to the bar.

FIG. 4a and FIG. 4b each show an enlarged detail illustration of the cross-sectional view of the seal 5, firstly in the unloaded state (FIG. 4a) and secondly in the compressed state (FIG. 4b). In this case, FIG. 4a in particular shows that the first surface element 16 runs at right angles to the vertical axis 11 of the seal 5, while the second surface element 17 runs parallel to the vertical axis 11 of the seal 5. In this case, the first circumferential rim 25 in the cross-sectional profile of the sealing lip 5 forms a raised area 14, and the second circumferential rim 26 in the cross-sectional profile of the sealing lip 5 forms a notch 13. When the seal 5 is in the compressed state as illustrated in FIG. 4b, the sealing lip 10 is positioned slightly away from the contact surface 30—which is not illustrated in FIG. 4b—in the direction of the lower face of the seal 5, so that the raised area 14 which is formed by the first circumferential rim 25 assumes a slightly exposed position and can make continuous contact with the contact surface 30 in order to achieve a sealing effect. The raised area 14 in this case exerts a relatively high contact pressure on the contact surface 30, thus making it possible to compensate for unevennesses and to improve the sealing effect. In this way, the raised area 14 itself becomes the sealing lip, while the sealing lip 10 produces an additional sealing effect for this purpose, particularly when the pressure on the contact surface 30 is high.

| | |
|---|---|
| 1 | Base body |
| 5 | Seal |
| 6 | Profile web |
| 7 | Profile rim |
| 8a, 8b | Cover |
| 10 | Sealing lip |
| 11 | Vertical axis |
| 13 | Notch |
| 14 | Raised area |
| 15 | Inner face of the sealing lip |
| 16 | First surface element |
| 17 | Second surface element |
| 18 | Third surface element |
| 19 | Inner surface |
| 20 | Profile lip |
| 21 | Base surface |
| 22 | Side wall |
| 23 | Cutout |
| 24 | Profile tab |
| 25 | First circumferential rim |
| 26 | Second circumferential rim |
| 27 | Third circumferential rim |
| 28 | Cavity |
| 29a, 29b | Vertical distance |
| 30 | Contact surface |
| 32 | Connecting socket |
| 33 | Opening |
| 34 | Spring |
| 35 | Profile rim |

The invention claimed is:

1. A seal for a cover for an electrical connecting socket, the electrical connecting socket provided on a base body, the cover extending over an area of the base body to be sealed, the seal comprising:
   a seal body having a first side facing away from the cover and a second, opposite side facing the cover, the seal body including at least one sealing lip on the first side of the seal body, the sealing lip being provided to make contact with a contact surface of the electrical connecting socket when the seal is in a compressed state and is configured to seal at least a part of the area of the base body over which the cover extends,
   wherein the sealing lip has at least one first circumferential rim on the first side, the first circumferential rim being formed, when the seal is in an unloaded state, by a contact edge of a first surface element and of a second surface element, wherein the first surface element and the second surface element run along the first side of the sealing lip, and
   wherein the sealing lip has at least one second circumferential rim which, when the seal is in the unloaded state, is formed by a contact edge of the second surface element and of a third surface element, wherein the second surface element and the third surface element run along the first side of the sealing lip, wherein the first circumferential rim makes contact with the contact surface of the electrical connecting socket when the seal is in the compressed state, and bounds the area of the base body to be sealed.

2. The seal as claimed in claim 1, wherein the seal has a vertical axis and wherein the first surface element runs at right angles to the vertical axis of the seal, and the second surface element runs parallel to the vertical axis of the seal.

3. The seal as claimed in claim 1, wherein the first circumferential rim forms a raised area in a cross-sectional profile of the sealing lip, and the second circumferential rim forms a notch in the cross-sectional profile of the sealing lip.

4. The seal as claimed in claim 1, wherein the sealing lip is pressed against the contact surface of the electrical connecting socket by a spring force.

5. The seal as claimed in claim 1, wherein the seal is formed from rubber-like material.

6. The seal as claimed in claim 1, wherein the seal is fitted to a side of the cover which faces the base body, and the contact surface of the electrical connecting socket is located on the base body, and the contact surface of the electrical connecting socket surrounds the connecting socket.

7. The seal as claimed in claim 6, wherein the seal body has at least one profile lip and at least one cutout on the second side facing the cover, wherein the profile lip and the cutout engage with a profile rim which is fitted on an inner face of the cover.

8. The seal as claimed in claim 7, wherein the seal has a base surface and wherein the sealing lip is arranged at a vertical distance from the base surface, and wherein the seal has a side wall which connects the sealing lip and the base surface to one another.

9. The seal as claimed in claim 8, wherein a profile tab, which projects at right angles from the base surface, is provided in a center of the base surface, on the first side of the seal body facing away from the cover.

10. The seal as claimed in claim 9, wherein the profile tab is wedge-shaped.

11. The seal as claimed in claim 9, wherein the profile tab is longer than the vertical distance between the base surface and the first circumferential rim of the sealing lip.

12. The seal as claimed in claim 9, wherein a cavity is provided in an interior of the profile tab, and is open on the second side of the seal, and engages with a profile web, which is provided on the cover and is fitted vertically on the side of the cover which faces the base body.

13. The seal as claimed in claim 12, wherein at least one of the cavity and the profile web have a cruciform cross section.

14. A connecting box comprising:
a base body including an electrical connecting socket having a contact surface, a pivotally moveable cover configured to cover an area of the base body, and a spring for biasing the cover to a closed position relative to the electrical connecting socket; and
a seal mounted to the cover, the seal having an inner face defining at least one sealing lip which is provided to make contact with the contact surface of the electrical connecting socket when the seal is in a compressed state and thus to seal at least a part of the area of the base body which is covered by the cover, wherein the sealing lip of the seal has at least one first circumferential rim on its inner face, wherein the rim is in each case formed, when the seal is in the unloaded state, by a contact edge of a first surface element and of a second surface element, each of the first surface element and the second surface element running along a surface of the sealing lip, and each has at least one second circumferential rim which, when the seal is in the unloaded state, is formed by the contact edge of the second surface element and of a third surface element, each of the second surface element and third surface element running along the surface of the sealing lip, with the first circumferential rim making contact with the contact surface of the electrical connecting socket when the seal is in the compressed state to bound and seal part of the area of the base body covered by the moveable cover.

15. The connecting box as claimed in claim 14, wherein the first surface element runs at right angles to a vertical axis of the seal, and the second surface element runs parallel to the vertical axis of the seal.

16. The connecting box as claimed in claim 14, wherein the first circumferential rim forms a raised area in a cross-sectional profile of the sealing lip, and the second circumferential rim forms a notch in the cross-sectional profile of the sealing lip.

17. The connecting box as claimed in claim 14, wherein the sealing lip is pressed against the contact surface of the electrical connecting socket by a spring force.

18. The connecting box as claimed in claim 14, wherein the seal is formed from rubber-like material.

19. The connecting box as claimed in claim 14, wherein the seal is fitted to a side of the cover facing the base body, and the contact surface of the electrical connecting socket is located on the base body.

20. The connecting box as claimed in claim 19, wherein the seal has at least one profile lip and at least one cutout on a side facing the cover, wherein the profile lip and the cutout engage with a profile rim which is fitted on an inner face of the cover.

21. The connecting box as claimed in claim 20, wherein the seal has a base surface with the sealing lip being arranged at a vertical distance from the base surface, and has a side wall which connects the sealing lip and the base surface to one another.

22. The connecting box as claimed in claim 21, wherein a profile tab, which projects at right angles from the base surface is provided in the center of the base surface, on a side of the seal facing away from the cover.

23. The connecting box as claimed in claim 22, wherein the profile tab is wedge-shaped.

24. The connecting box as claimed in claim 22, wherein the profile tab is longer than the vertical distance between the base surface and the first circumferential rim of the sealing lip.

25. The connecting box as claimed in claim 22, wherein a cavity is provided in an interior of the profile tab, is open on a lower face of the seal and engages with a profile web, which is provided on the cover and is fitted vertically on the side of the cover which faces the base body.

26. The connecting box as claimed in claim 25, wherein at least one of the cavity and the profile web have a cruciform cross section.

* * * * *